United States Patent
Freund

(10) Patent No.: US 8,074,277 B2
(45) Date of Patent: Dec. 6, 2011

(54) SYSTEM AND METHODOLOGY FOR INTRUSION DETECTION AND PREVENTION

(75) Inventor: Gregor Paul Freund, San Francisco, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 1495 days.

(21) Appl. No.: 10/907,335

(22) Filed: Mar. 29, 2005

(65) Prior Publication Data

US 2005/0273857 A1 Dec. 8, 2005

Related U.S. Application Data

(60) Provisional application No. 60/521,624, filed on Jun. 7, 2004.

(51) Int. Cl.
- *G06F 11/00* (2006.01)
- *G06F 12/14* (2006.01)
- *G06F 12/16* (2006.01)
- *G08B 23/00* (2006.01)

(52) U.S. Cl. ............... 726/23; 726/3; 726/4; 726/22; 726/24; 726/25; 713/154; 713/188

(58) Field of Classification Search ............... 726/3–4, 726/22–25; 713/154, 188
See application file for complete search history.

(56) References Cited

U.S. PATENT DOCUMENTS

| | | | |
|---|---|---|---|
| 5,805,801 A | 9/1998 | Holloway et al. | |
| 6,205,551 B1 * | 3/2001 | Grosse | 726/25 |
| 6,279,113 B1 | 8/2001 | Vaidya | |
| 6,363,489 B1 | 3/2002 | Comay et al. | |
| 6,370,648 B1 | 4/2002 | Diep | |
| 6,460,141 B1 | 10/2002 | Olden | |
| 6,477,651 B1 | 11/2002 | Teal | |
| 6,487,666 B1 | 11/2002 | Shanklin et al. | |
| 6,775,657 B1 | 8/2004 | Baker | |
| 6,785,821 B1 * | 8/2004 | Teal | 726/23 |
| 6,826,697 B1 | 11/2004 | Moran | |
| 6,871,284 B2 * | 3/2005 | Cooper et al. | 726/1 |
| 6,895,432 B2 | 5/2005 | Ando et al. | |
| 6,895,436 B1 | 5/2005 | Caillau et al. | |
| 6,957,348 B1 * | 10/2005 | Flowers et al. | 726/23 |
| 6,973,580 B1 | 12/2005 | Carroll et al. | |
| 6,981,146 B1 | 12/2005 | Sheymov | |
| 6,996,843 B1 | 2/2006 | Moran | |

(Continued)

OTHER PUBLICATIONS

Microsoft TechNet. "Microsoft Security Bulletin MS02-068: Cumulative Patch for Internet Explorer (324929)" Dec. 4, 2002.*

*Primary Examiner* — Edan Orgad
*Assistant Examiner* — Kari Schmidt
(74) *Attorney, Agent, or Firm* — John A. Smart; G. Mack Riddle

(57) ABSTRACT

System and methodology for intrusion detection and prevention is described. In one embodiment, for example, a method is described for detecting and preventing network intrusion, the method comprises steps of: defining intrusion descriptions specifying exploits that may be attempted by malicious network traffic, the intrusion descriptions indicating specific applications that may be targeted by individual exploits; for a particular application participating in network communication, deriving a subset of the intrusion descriptions specifically applicable to that particular application; using the subset of the intrusion descriptions specifically applicable to that application, monitoring network traffic destined for the particular application for detecting an attempted network intrusion; and if a network intrusion is detected, blocking network traffic destined for the particular application determined to comprise an exploit.

41 Claims, 7 Drawing Sheets

U.S. PATENT DOCUMENTS

| | | | |
|---|---|---|---|
| 7,007,301 B2 | 2/2006 | Crosbie et al. | |
| 7,017,185 B1 | 3/2006 | Wiley et al. | |
| 7,032,114 B1 | 4/2006 | Moran | |
| 7,035,387 B2 | 4/2006 | Russell et al. | |
| 7,058,821 B1 | 6/2006 | Parekh et al. | |
| 7,065,657 B1 | 6/2006 | Moran | |
| 7,073,198 B1 * | 7/2006 | Flowers et al. | 726/25 |
| 7,080,250 B2 | 7/2006 | Calvert | |
| 7,089,428 B2 | 8/2006 | Farley et al. | |
| 7,089,592 B2 | 8/2006 | Adjaoute | |
| 7,093,290 B2 | 8/2006 | Han et al. | |
| 7,093,292 B1 | 8/2006 | Pantuso | |
| 7,134,141 B2 | 11/2006 | Crosbie et al. | |
| 7,152,105 B2 | 12/2006 | McClure et al. | |
| 7,162,742 B1 | 1/2007 | Flowers et al. | |
| 7,174,566 B2 | 2/2007 | Yadav | |
| 7,181,768 B1 | 2/2007 | Ghosh et al. | |
| 7,185,368 B2 | 2/2007 | Copeland | |
| 7,203,962 B1 | 4/2007 | Moran | |
| 7,224,678 B2 | 5/2007 | Billhartz | |
| 7,228,564 B2 | 6/2007 | Raikar et al. | |
| 7,240,368 B1 | 7/2007 | Roesch et al. | |
| 7,243,148 B2 | 7/2007 | Keir et al. | |
| 7,448,084 B1 * | 11/2008 | Apap et al. | 726/24 |
| 2002/0010855 A1 * | 1/2002 | Reshef et al. | 713/164 |
| 2002/0129264 A1 * | 9/2002 | Rowland et al. | 713/200 |
| 2003/0084323 A1 | 5/2003 | Gales | |
| 2003/0145228 A1 * | 7/2003 | Suuronen et al. | 713/201 |
| 2003/0149887 A1 | 8/2003 | Yadav | |
| 2003/0149888 A1 * | 8/2003 | Yadav | 713/200 |
| 2005/0060432 A1 * | 3/2005 | Husain et al. | 709/246 |
| 2005/0182949 A1 * | 8/2005 | Phillips et al. | 713/189 |
| 2005/0240780 A1 * | 10/2005 | MacIsaac | 713/188 |
| 2006/0037077 A1 | 2/2006 | Gadde et al. | |
| 2006/0053491 A1 | 3/2006 | Khuti et al. | |
| 2007/0107052 A1 | 5/2007 | Cangini et al. | |

* cited by examiner

SYSTEM AND METHODOLOGY FOR INTRUSION DETECTION AND PREVENTION

CROSS REFERENCE TO RELATED APPLICATIONS

The present application is related to and claims the benefit of priority of the following commonly-owned, presently-pending provisional application(s): application Ser. No. 60/521,624, filed Jun. 7, 2004, entitled "System and Methodology for Intrusion Detection and Prevention", of which the present application is a non-provisional application thereof. The present application is related to the following commonly-owned, presently-pending application(s): application Ser. No. 60/521,623, filed Jun. 7, 2004, entitled "Security System with Methodology Providing Verified Secured Individual End Points"; application Ser. No. 10/907,331, filed Mar. 29, 2005, entitled "Security System with Methodology Providing Verified Secured Individual End Points". The disclosures of each of the foregoing applications are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

1. Field of the Invention

The present invention relates generally to computer security and, more particularly, to a system and methodology for detecting and preventing intrusions on a per-application basis.

2. Description of the Background Art

The first computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs". In both cases, maintaining security and controlling what information a computer user could access was relatively simple because the overall computing environment was limited and clearly defined.

With the ever-increasing popularity of the Internet, however, more and more computers are connected to larger networks. Providing access to vast stores of information, the Internet is typically accessed by users through Web "browsers" (e.g., Microsoft® Internet Explorer or Netscape Navigator) or other Internet applications. Browsers and other Internet applications include the ability to access a URL (Universal Resource Locator) or "Web" site. In the last several years, the Internet has become pervasive and is used not only by corporations, but also by a large number of small business and individual users for a wide range of purposes.

As more and more computers are now connected to the Internet, either directly (e.g., over a dial-up or broadband connection with an Internet Service Provider or "ISP") or through a gateway between a LAN and the Internet, a whole new set of challenges face LAN administrators and individual users alike: these previously closed computing environments are now open to a worldwide network of computer systems. A particular set of challenges involves attacks by perpetrators (hackers) capable of damaging the local computer systems, misusing those systems, and/or stealing proprietary data and programs.

The software industry has, in response, introduced a number of products and technologies to address and minimize these threats, including "firewalls", proxy servers, and similar technologies—all designed to keep malicious users (e.g., hackers) from penetrating a computer system or corporate network. Firewalls are applications that intercept the data traffic at the gateway to a Wide Area Network ("WAN") and check the data packets (i.e., Internet Protocol packets or "IP packets") being exchanged for suspicious or unwanted activities.

Another security measure that has been utilized by many users is to install an end point security (or personal firewall) product on a computer system to control traffic into and out of the system. An end point security product can regulate all traffic into and out of a particular computer. One such product is assignee's ZoneAlarm® product that is described in detail in U.S. Pat. No. 5,987,611, the disclosure of which is hereby incorporated by reference. For example, an end point security product may permit specific "trusted" applications to access the Internet while denying access to other applications on a user's computer. To a large extent, restricting access to "trusted" applications is an effective security method. However, despite the effectiveness of end point security products, issues remain in protecting computer systems against attack by malicious users and applications.

One problem that remains is that trusted applications often have known vulnerabilities that make then susceptible to attack or exploitation by hackers and other malicious users. A vulnerability is a feature or a combination of features of a system that allows a malicious adversary to place the system in a state that is both contrary to the desires of the user(s) of the system and increases the risk (probability or consequence) of undesirable behavior. These vulnerabilities may include, for example, coding errors in applications, means for bypassing certain security safeguards, and the like. An example of a vulnerability is a program with a buffer that can be overflowed with data supplied by the invoker. The vulnerability may also prevent the successful implementation of a particular security policy for the system.

In an ideal case, a user or system administrator that is informed that a program (e.g., application) he or she is using has known vulnerabilities will upgrade the program (e.g., apply a patch) in order to address the specific vulnerabilities that have been discovered. However, in many cases, applying a patch or otherwise upgrading an application to address known problems is not practicable. One problem is that certain widely used programs (e.g., for the Microsoft Windows environment) may require frequent application of patches to address security vulnerabilities. The sheer volume of patches that may be required can deter many users from applying them.

Another obstacle is that applying a patch may cause other problems. Users testing patches before applying them sometimes encounter conflicts and incompatibilities with other programs and/or errors in the patches. These conflicts and errors generally result from the fact that patches are released with little or no testing in an attempt to rapidly respond to reported errors and vulnerabilities. Because patches are usually not subjected to rigorous testing (e.g., beta test programs), they may sometimes introduce more problems than they solve. Many users, particularly more experienced users, are reluctant to install patches for this reason.

Users are also deterred from applying patches by the fact that in many cases the patches that need to be applied are quite large (e.g., in the case of operating system patches). In particular, the size of download files may deter users that only have limited bandwidth available for file downloads (e.g., users with a dial-up connection to the Internet). For reasons such as these, many users do not apply all patches and continue to use applications with known vulnerabilities for extended periods of time.

Another alternative for protecting against known system vulnerabilities is to use intrusion detection and/or intrusion prevention solutions. Typically, both intrusion detection and intrusion prevention solutions work by monitoring the traffic on the network, noting which devices they are communicating with, and categorizing the types of traffic interacting with the devices. Traffic patterns are then compared against known attack or exploit signatures. Generally, an attack is an action conducted by an adversary or intruder with a specific objective in mind against a victim. From the perspective of the victim (e.g., a user or administrator responsible for maintaining a system), an attack is a set of one or more events that may have one or more security consequences. An exploit is the process of using a system vulnerability to violate a system security policy. A tool or defined method that could be used to violate a security policy is often referred to as an exploit script. An exploit seeks, in some way, to take advantage of a vulnerability in a system in the pursuit or achievement of some objective. All vulnerability exploitations are attacks, but not all attacks exploit vulnerabilities. For purposes of the following discussion both attacks and exploits will generally be referred to as "exploits" or "intrusions".

Intrusion detection and prevention solutions seek to detect and prevent intrusions (i.e., attacks and exploits). These solutions typically use known signatures to recognize traffic patterns (pattern-matching), similar to the way anti-virus products use known signatures to recognize viruses. The signatures are often based on malicious TCP/IP packets, since hackers commonly try to manipulate those packets to perform a malicious action. Intrusion detection solutions report (i.e., warn the user of) patterns that indicate a possible attack (e.g., based upon certain thresholds and severity levels). Intrusion prevention solutions go further by blocking suspicious traffic, terminating the connection, reconfiguring selected firewalls, or taking other actions in response to the detection of any intrusion.

A problem with current intrusion detection and intrusion prevention solutions (sometimes referred to herein as "IDS") is that these solutions are notorious for reporting a large number of "false positives". A false positive is an event which is incorrectly identified by the IDS as being an intrusion when none has occurred. In other words, current solutions frequently report and/or block innocent traffic. Blocking innocent traffic, in particular, can be problematic as it introduces the possibility of random network failure based on the (incorrect) matching of traffic with signatures of known exploits. On the other hand, if the IDS uses more narrow pattern matching criteria, then it is less effective as the IDS only recognizes common instances of known exploits and may not detect attacks having minor variations from the common case. For example, a personal computer may be subject to an RPC (remote procedure call) exploit because of a vulnerability of the operating system. If the pattern-matching criteria is defined narrowly (e.g., so as to avoid issuance of "false positives"), then the IDS may detect an MS-Blast attack, but not the entire class of RPC exploits to which the computer may be vulnerable. In practice, providing greater security using current intrusion detection/prevention solutions comes at the expense of requiring the user (or administrator) to sort through a larger number of reported attacks that turn out to be false positives.

Another limitation of current solutions is in handling encrypted traffic. Message encryption is a problem, especially for network-based intrusion systems. Encryption makes the practice of looking for particular patterns in packet bodies difficult if not impossible using current solutions. Useful analysis can be performed only after the message has been decrypted on the target host, and this often occurs within a specific application or at a level which cannot be detected by current intrusion detection/prevention solutions.

What is needed is a solution that is able to determine specific exploits that may apply in particular circumstances enabling a more focused examination of whether particular traffic matches the pattern of the exploits that may apply in particular circumstances. Ideally, the solution should enable intrusions to be more accurately detected and prevented, while also minimizing the number of false positives that are generated by the solution. The present invention provides a solution for these and other needs.

SUMMARY OF INVENTION

System and methodology for intrusion detection and prevention is described. In one embodiment, for example, a method of the present invention is described for detecting and preventing network intrusion, the method comprises steps of: defining intrusion descriptions specifying exploits that may be attempted by malicious network traffic, the intrusion descriptions indicating specific applications that may be targeted by individual exploits; for a particular application participating in network communication, deriving a subset of the intrusion descriptions specifically applicable to that particular application; using the subset of the intrusion descriptions specifically applicable to that application, monitoring network traffic destined for the particular application for detecting an attempted network intrusion; and if a network intrusion is detected, blocking network traffic destined for the particular application determined to comprise an exploit.

In another embodiment, for example, a network intrusion detection and prevention system of the present invention is described that comprises: a plurality of intrusion descriptions specifying exploits that may be attempted by malicious network traffic, the intrusion descriptions indicating specific applications that may be targeted by individual exploits; a module for deriving a subset of the intrusion descriptions specifically applicable to that particular application for a particular application participating in network communication; and an application filter for monitoring network traffic destined for the particular application for detecting an attempted network intrusion using the subset of the intrusion descriptions specifically applicable to that application, and for blocking network traffic destined for the particular application determined to comprise an exploit.

In yet another embodiment, for example, an improved network intrusion detection and prevention system, the improvement comprises: splitting network traffic into different streams of network packets, based on which respective application each individual network packet is destined for; for a given stream and its respective application, determining particular intrusion detection signatures applicable to that respective application; and applying intrusion detection and prevention to the given stream using the particular intrusion detection signatures applicable to the given stream's respective application.

In another embodiment, for example, a system of the present invention for blocking malicious network traffic is described that comprises: means for storing a repository specifying on a per-application basis various exploits that may be attempted by network traffic; means, responsive to the repository, for application-specific monitoring of network traffic, such that only network traffic destined for a particular application is examined for exploits relevant to that particular application; and means, responsive to the means for application-specific monitoring, for blocking network traffic identified as an exploit.

DETAILED DESCRIPTION

Glossary

Figure 1:
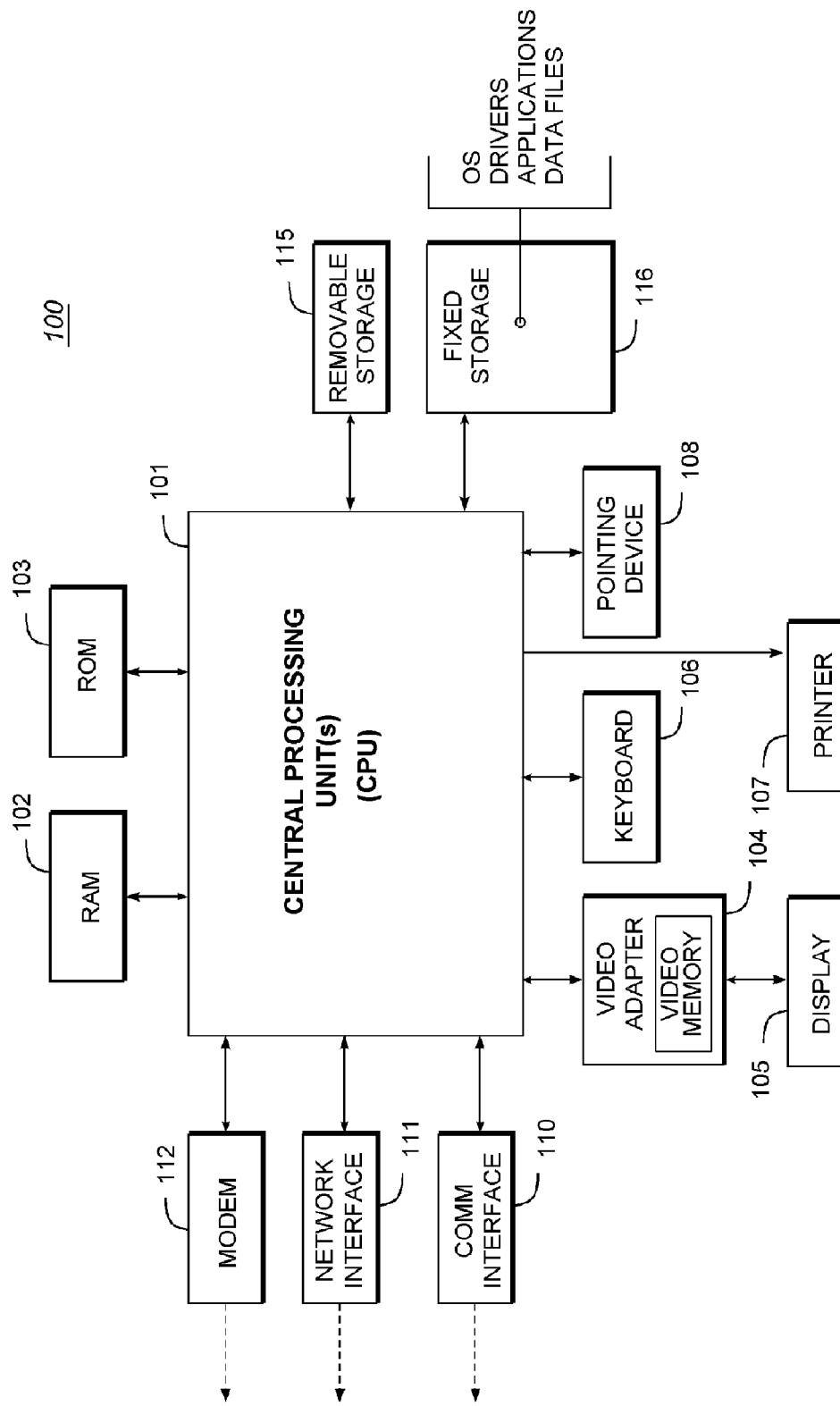
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

End point security: End point security is a way of managing and enforcing security on each computer instead of relying upon a remote firewall or a remote gateway to provide security for the local machine or environment. End point security involves a security agent that resides locally on each machine. This agent monitors and controls the interaction of the local machine with other machines and devices that are connected on a LAN or a larger wide area network (WAN), such as the Internet, in order to provide security to the machine.

Firewall: A firewall is a set of related programs, typically located at a network gateway server, that protects the resources of a private network from other networks by controlling access into and out of the private network. (The term also implies the security policy that is used with the programs.) A firewall, working closely with a router program, examines each network packet to determine whether to forward it toward its destination. A firewall may also include or work with a proxy server that makes network requests on behalf of users. A firewall is often installed in a specially designated computer separate from the rest of the network so that no incoming request directly accesses private network resources.

Hash: A hash (or hash value) is a smaller data type (e.g., number) that represents another, larger, data type (usually a string). A hash is typically a number that is generated from a string of text by a hashing function. The hash is substantially smaller than the text itself, and is generated in such a way that it is unlikely that some other text will produce the same hash value. Hashes play a role in security systems (e.g., to ensure that transmitted messages or files have not been tampered with). Hashing is also a method for facilitating access to data records. Consider, for example, a list of names: John Smith, Sarah Jones, and Roger Adams. To create an index, called a hash table, for these records, one would apply a hashing function to each name to produce a unique numeric value such as the following: 1345873 John Smith, 3097905 Sarah Jones, 4060964 Roger Adams. To search for the record containing the name Sarah Jones, one just needs to reapply the hashing function, which directly yields the index key to the record. This is much more efficient than searching through all the records until the matching record is found.

HTTP: HTTP is the acronym for HyperText Transfer Protocol, which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in "RFC 2616: Hypertext Transfer Protocol—HTTP/1.1," the disclosure of which is hereby incorporated by reference. RFC 2616 is available from the World Wide Web Consortium (W3C), and is available via the Internet (e.g., currently at www.w3.org/Protocols/). Additional description of HTTP is available in the technical and trade literature, see e.g., Stallings, W., "The Backbone of the Web," BYTE, October 1996, the disclosure of which is hereby incorporated by reference.

MD5: MD5 is a message-digest algorithm which takes as input a message of arbitrary length and produces as output a 128-bit "fingerprint" or "message digest" of the input. The MD5 algorithm is used primarily in digital signature applications, where a large file must be "compressed" in a secure manner before being encrypted with a private (secret) key under a public-key cryptosystem. Further description of MD5 is available in "RFC 1321: The MD5 Message-Digest Algorithm", (April 1992), the disclosure of which is hereby incorporated by reference. A copy of RFC 1321 is available via the Internet (e.g., currently at www.ietf.org/rfc/rfc1321.txt).

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

RPC: RPC stands for remote procedure call, a type of protocol that allows a program on one computer to execute a program on another computer (e.g., a server computer). Using RPC, a system developer need not develop specific procedures for the server. The client program sends a message to the server with appropriate arguments and the server returns a message containing the results of the program executed. For further description of RPC, see e.g., RFC 1831 titled "RPC: Remote Procedure Call Protocol Specification Version 2", available from the Internet Engineering Task Force (IETF), the disclosure of which is hereby incorporated by reference. A copy of RFC 1831 is available via the Internet (e.g., currently at www.ietf.org/rfc/rfc1831.txt).

Security policy: In general terms, a security policy is an organization's statement defining the rules and practices that regulate how it will provide security, handle intrusions, and recover from damage caused by security breaches. An explicit and well-defined security policy includes a set of rules that are used to determine whether a given subject will be permitted to gain access to a specific object. A security policy may be enforced by hardware and software systems that effectively implement access rules for access to systems and information. Further information on security policies is available in "RFC 2196: Site Security Handbook, (September 1997)", the disclosure of which is hereby incorporated by reference. A copy of RFC 2196 is available from the IETF via the Internet (e.g., currently at www.ietf.org/rfc/rfc2196.txt). For additional information, see also, e.g., "RFC 2704: The KeyNote Trust Management System Version 2", the disclosure of which is hereby incorporated by reference. A copy of RFC 2704 is available from the IETF via the Internet (e.g., currently at www.ietf.org/rfc/rfc2704.txt). In this document, "security policy" or "policy" refers to a set of security policies and rules employed by an individual or by a corporation, government entity, or any other organization operating a network or other computing resources.

SSL: SSL is an abbreviation for Secure Sockets Layer, a protocol developed by Netscape for transmitting private documents over the Internet. SSL works by using a public key to encrypt data that is transferred over the SSL connection. Both Netscape Navigator and Microsoft Internet Explorer support SSL, and many Web sites use the protocol to obtain confidential user information, such as credit card numbers. SSL creates a secure connection between a client and a server, over which data can be sent securely. For further information, see e.g., "The SSL Protocol, version 3.0", (Nov. 18, 1996), from the IETF, the disclosure of which is hereby incorporated by reference. See also, e.g., "RFC 2246: The TLS Protocol, version 1.0", available from the IETF. A copy of RFC 2246 is available via the Internet (e.g., currently at www.itef.org/rfc/rfc2246.txt).

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see e.g., "RFC 793: Transmission Control Program DARPA Internet Program Protocol Specification", the disclosure of which is hereby incorporated by reference. A copy of RFC 793 is available via the Internet (e.g., currently at www.ietf.org/rfc/rfc793.txt).

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial", the disclosure of which is hereby incorporated by reference. A copy of RFC 1180 is available via the Internet (e.g., currently at www.ietf.org/rfc/rfc1180.txt).

UDP: UDP stands for User Datagram Protocol, a connectionless protocol that, like TCP, runs on top of IP networks. Unlike TCP/IP, UDP/IP provides very few error recovery services, offering instead a direct way to send and receive datagrams over an IP network. UDP is used primarily for broadcasting messages over a network. For additional information on UDP, see RFC 768, "User Datagram Protocol", the disclosure of which is hereby incorporated by reference. A copy of RFC 768 is available via the Internet (e.g., currently at www.ietf.org/rfc/rfc768.txt).

VPN: VPN stands for Virtual Private Network, a network that is constructed by using public wires to connect nodes. For example, there are a number of systems that enable creation of networks using the Internet as the medium for transporting data. These systems use encryption and other security mechanisms to ensure that only authorized users can access the network and that the data cannot be intercepted. For further description of a system providing authenticated access over a public network, see e.g., U.S. Pat. No. 6,324,648, "Secure gateway having user identification and password authentication," the disclosure of which is hereby incorporated by reference. VPN products are available from a variety of vendors. Representative vendors include Check Point Software of Redwood City, Calif., Cisco Systems, Inc. of San Jose, Calif., and Intel Corporation of Santa Clara, Calif.

Winsock: Windows Sockets 2 (Winsock) is a Microsoft-provided interface that enables programmers to create advanced Internet, intranet, and other network-capable applications to transmit application data across the wire, independent of the network protocol being used. With Winsock, programmers are provided access to advanced Microsoft Windows networking capabilities such as multicast and Quality of Service (QOS). Winsock follows the Windows Open System Architecture (WOSA) model; it defines a standard service provider interface (SPI) between the application programming interface (API), with its exported functions and the protocol stacks. It uses the sockets paradigm that was first popularized by Berkeley Software Distribution (BSD) UNIX. It was later adapted for Windows in Windows Sockets 1.1, with which Windows Sockets 2 applications are backward compatible. Winsock programming previously centered around TCP/IP. Some programming practices that worked with TCP/IP do not work with every protocol. As a result, the Windows Sockets 2 API adds functions where necessary to handle several protocols. For further information regarding Winsock, see e.g., "Winsock Reference", available from Microsoft Corporation, the disclosure of which is hereby incorporated by reference. A copy of this documentation is available via the Internet (e.g., currently at msdn.microsoft.com/library/default.asp?url=/library/en-us/winsock/winsock/winsock_reference.asp).

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations. For further description of XML, see e.g., "Extensible Markup Language (XML) 1.0", (2nd Edition, Oct. 6, 2000) a recommended specification from the W3C, the disclosure of which is hereby incorporated by reference. A copy of this specification is available via the Internet (e.g., currently at www.w3.org/TR/REC-xml).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
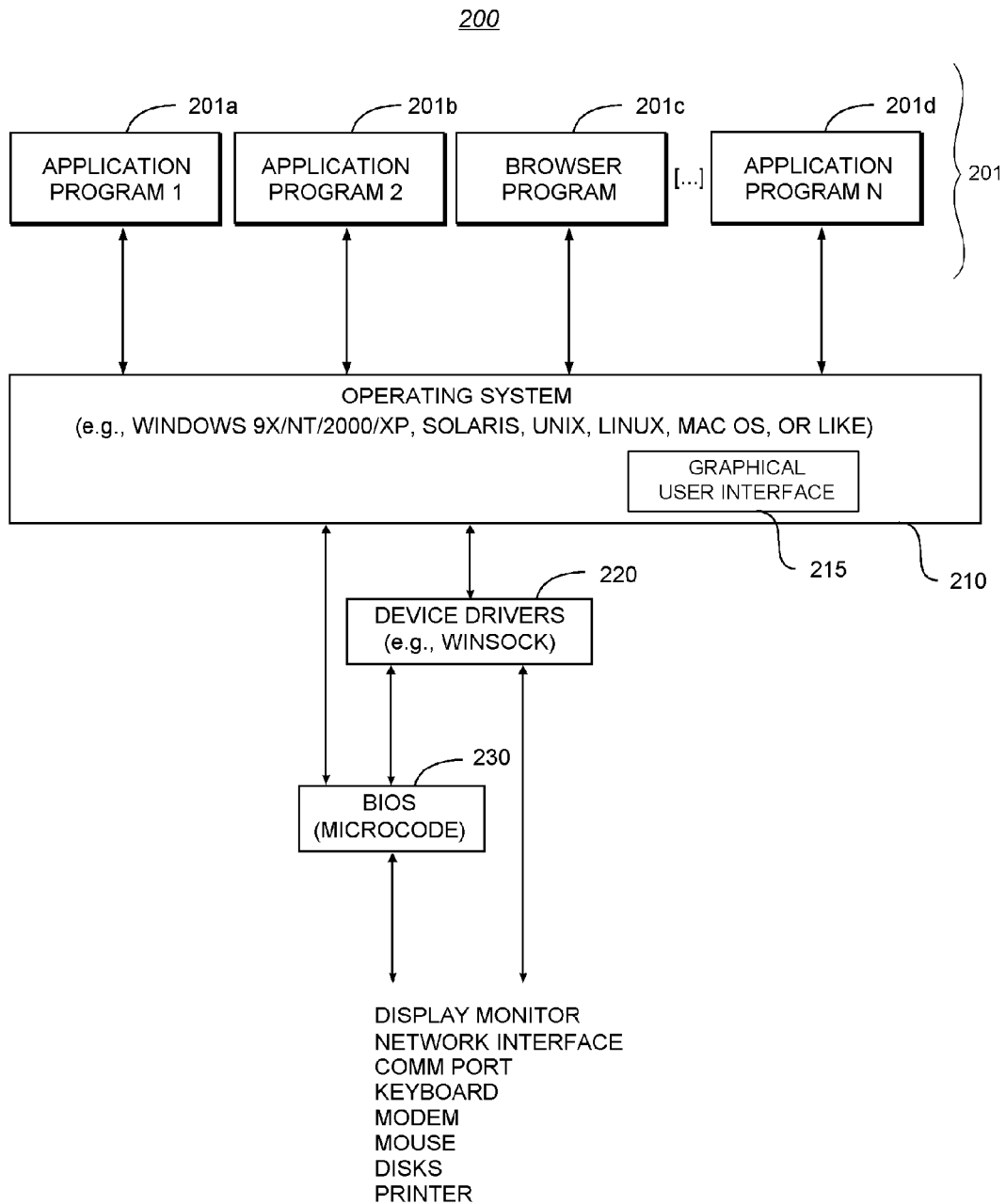
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a network connecting together different computers, such as a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of Intrusion Detection and Prevention on Per-Application Basis

The present invention provides an improved intrusion detection/prevention solution which distinguishes data streams (i.e., traffic) on a per-application or per-program basis. For example, network traffic that is directed to Microsoft Internet Explorer can be distinguished from traffic going to an Opera Web browser. The system of the present invention resides on the host and looks at traffic not only at the networking layer, but also above the TCP/IP stack to verify the application that is the destination (or source) of particular network traffic. This information can be used to verify whether the application is a trusted application, determine whether the application is to be allowed access to the Internet, and so forth. Significantly, this information can also be used to detect and prevent intrusions on a per-application basis.

If a malicious packet is able to reach its intended target (namely, parser code at a particular target application), then a malicious packet has an opportunity to exercise that code and potentially take over the machine. Therefore, in accordance with the present invention, network traffic (packets) are given as little opportunity as possible to exercise code. In other words, the approach is to make as little executable code as possible available to arbitrary packets from a hacker. In this manner, packets are able to reach parsing code under narrow circumstances—such as, when an application whose vulnerabilities have been probed for is running.

Looking at network traffic on a per-application (or per-program) basis provides the ability to more narrowly define and apply intrusion detection and prevention measures to determine if network traffic matches the pattern of a known exploit (i.e., an attack or exploit as previously described) that may affect a particular application. For example, a specific application (or an operating system component, or operating system service, or other program) installed on a machine may be vulnerable to 1,000 potential exploits which have known patterns. A second program may be vulnerable to a different set of 1,000 known exploits, a third program vulnerable to another 500 known exploits, and so on and so forth. Prior art solutions generally develop an extensive list of all known exploits and evaluate patterns of these exploits against network traffic on a general basis. As described above, one major disadvantage of this approach is that it generally results in a large number of false positives. Also, given the large number of patterns to be matched against network traffic, prior art solutions must perform the pattern matching analysis quickly so as not to create a bottleneck on system performance. As a result, these solutions are sometimes less effective in detecting certain exploits that can only be detected by analyzing a series of packets.

The present invention enables a more fine-grained and accurate pattern matching to be performed in order to detect and prevent potential exploits. Rather than to attempt to evaluate the patterns of thousands of known exploits against network traffic on a general basis, the approach of the present invention is to examine traffic to a specific program (e.g., an application program or component thereof) for only those known exploits that relate to that specific program (or component). For instance, if a particular program (e.g., Microsoft Outlook) is not installed on a computer system, then there is no reason to look for intrusions that attempt to exploit vulnerabilities in that program.

The pattern matching performed in accordance with the methodology of the present invention takes into account the specific circumstances in which a particular program (e.g., application) or component receiving communications (traffic) may be vulnerable to an attack. Only those patterns that specifically relate to the particular program (which may be evaluated at the level of specific program versions, program components, registry settings, and so forth as hereinafter described) are compared to traffic to such program in an attempt to detect and prevent attacks and exploits. The methodology of the present invention provides that traffic to a vulnerable program is only blocked (or fixed as described below) when it is determined that the traffic matches a pattern that is potentially harmful given the specific program (e.g., application) to which the traffic is directed and other known details of the current system environment.

By examining traffic on a per-program (or per-application) basis, a more accurate and complete pattern matching operation may be performed. The methodology of the present invention also substantially reduces the problem of false positives as the checks that are made are narrowed so as to only look for the specific known vulnerabilities to which particular traffic relates. For example, traffic directed to an Opera Web browser may match a pattern indicating that it might comprise a known Internet Explorer exploit. However, the traffic will not be blocked as the Opera browser is not susceptible to this exploit. As another example, the same traffic directed to Internet Explorer is generally not blocked if the particular version of Internet Explorer that is in use has been updated to cure this particular vulnerability. Instead, the traffic is only stopped when it is directed to a version of Internet Explorer which is vulnerable to this particular exploit.

The present invention enables much more specifically defined pattern matching criteria to be applied to network traffic for detecting and preventing intrusions. It should be emphasized that the methodology of the present invention enables this evaluation (i.e., pattern matching) to be performed not just on a per-application (or per-program) basis, but may also be used for even more fine-grained analysis. For example, traffic which is directed to a specific component of the application (e.g., a dynamic link library) may be evaluated separately given that certain attacks attempt to exploit particular components. By more specifically identifying and evaluating patterns that represent known vulnerabilities of the specific components and programs that are in use, stronger rules may be applied without generating an excessive number of false positives.

System Components

Figure 3:
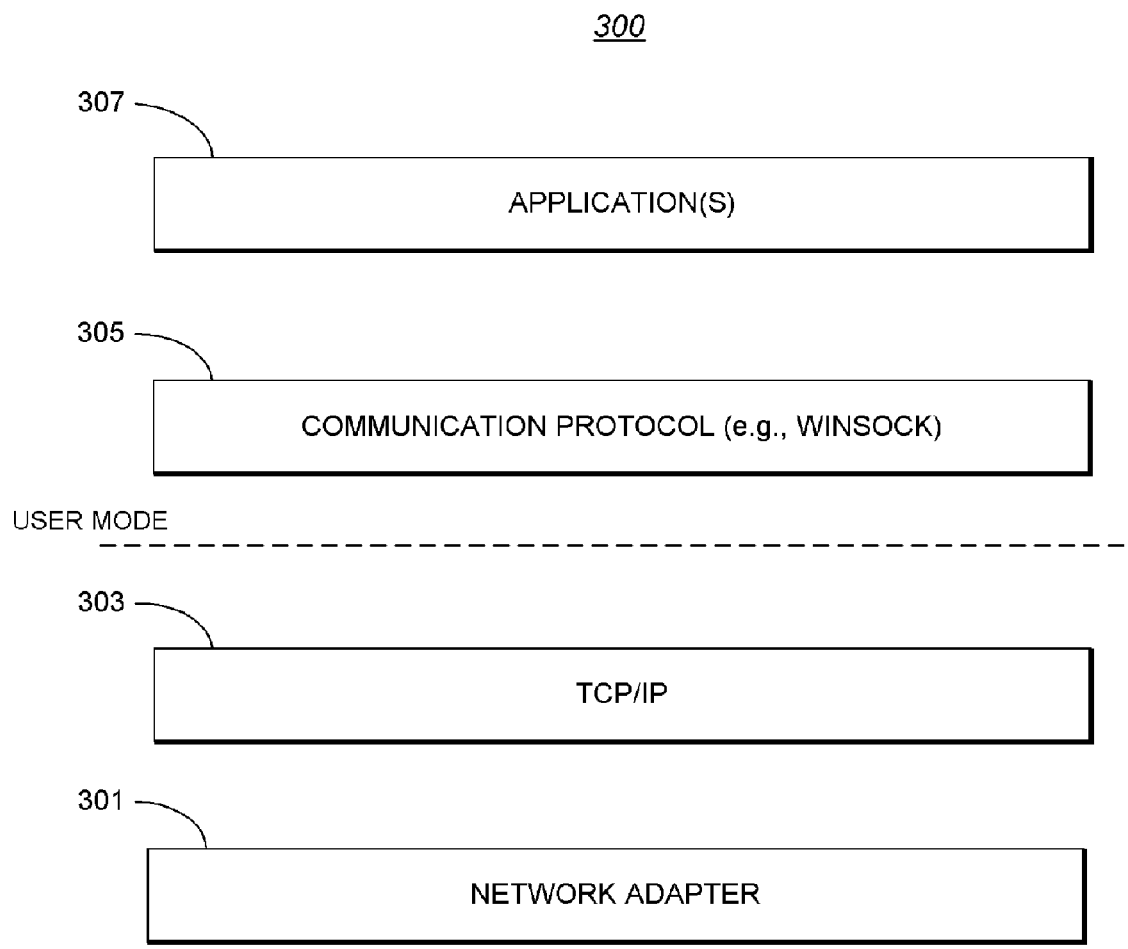
FIG. 3 is a block diagram illustrating a communication stack.

Before describing the components of the system of the present invention, the structure of a typical communication stack at a machine (e.g., the above-described system 100) will be briefly described. FIG. 3 is a block diagram illustrating a communication stack 300. At the highest level of the stack are application(s) 307. In order to access the Internet or otherwise communicate, the application(s) 307 use a communication layer (Winsock, or similar) 305. As shown at FIG. 3, these top two layers are in user mode. Below are two additional layers at the operating system (OS) kernel level. The first of these two layers is the protocol implementation, such as a TCP/IP layer 303. At the lowest level of the communication stack 300 is the network adapter 301. Further description of communication layers for intercomputer communications is provided in The OSI Reference Model, a logical structure for communication systems. The OSI Reference Model was standardized by the International Standards Organization (ISO) as ISO/IED standard 7498-1:1994: "Information technology—Open Systems Interconnection—Basic Reference Model: The Basic Model," available from the ISO, the disclosure of which is hereby incorporated by reference.

The OSI Reference Model (or "OSI model") is considered the primary architectural model for intercomputer communications. The OSI model divides the tasks involved with moving information between networked computers into seven smaller, more manageable task groups. A task or group of tasks is then assigned to each of the seven layers of the OSI model. The layers of the OSI model can be divided into two general categories: upper layers and lower layers. The upper layers of the OSI model deal with application issues and generally are implemented in software. The highest layer, the application layer, is closest to the end user (e.g., as shown at FIG. 3). Both users and application layer processes interact with software applications that contain a communications component. The lower layers of the OSI model handle data transport issues. Actual protocol stacks often combine one or more of the OSI layers into a single layer as it is not necessary to develop a separate layer for each and every function outlined in the OSI model. However, developers are able to ensure that a certain level of compatibility is maintained by following the general guidelines provided by the OSI model.

Figure 4A:
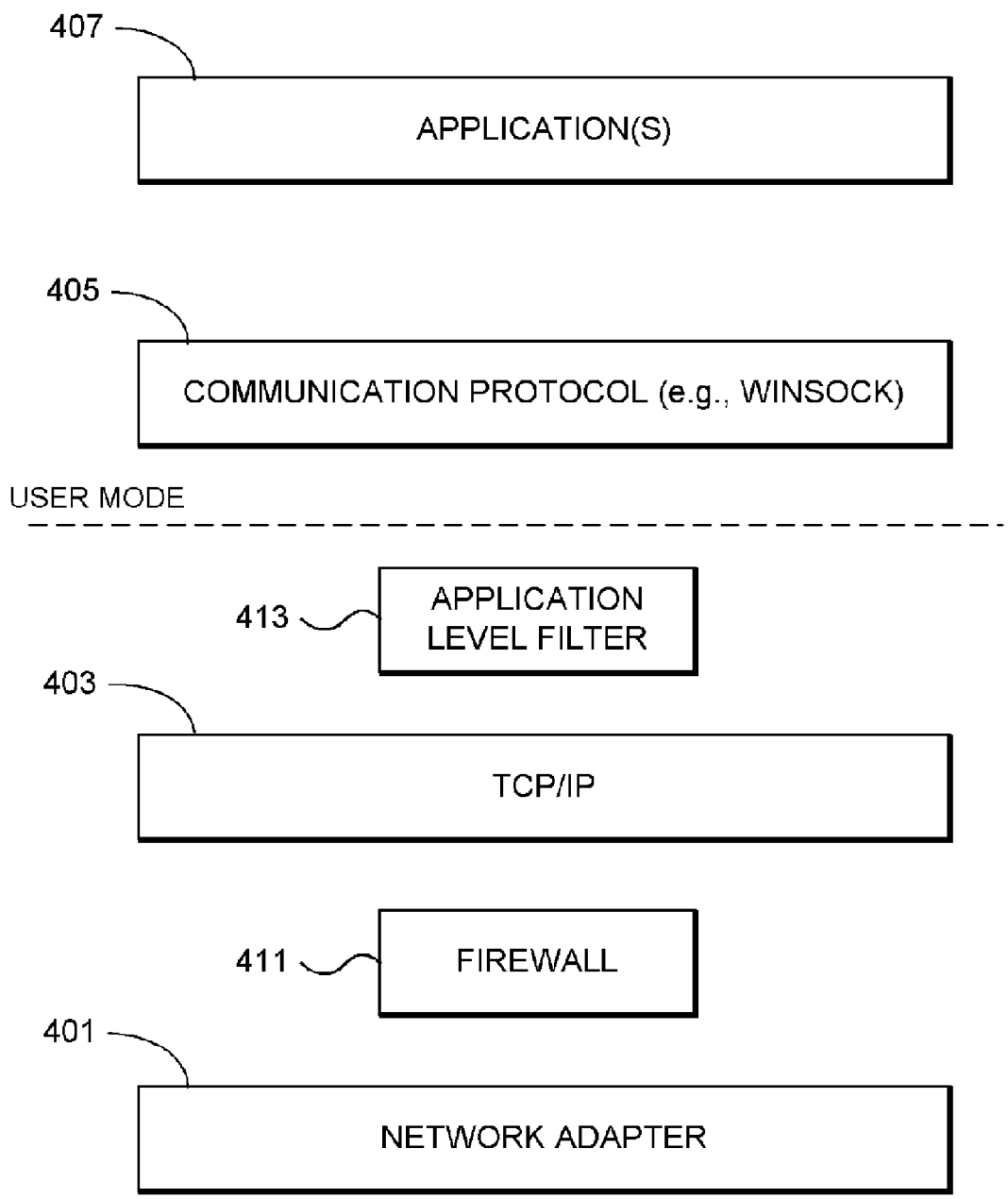
FIG. 4A is an adaptation of FIG. 3 showing where traffic may be conveniently intercepted.

In accordance with the present invention an agent or filter is provided that intercepts incoming and outgoing traffic. Of particular concern is incoming traffic which is intercepted at two different levels. FIG. 4A is an adaptation of FIG. 3 showing where traffic may be conveniently intercepted. In particular, a firewall 411 may intercept traffic between the TCP/IP layer (now shown at 403) and the network adapter (now shown at 401); an application level filter 413 intercepts traffic just above the TCP/IP layer 403. In the currently preferred embodiment, both the firewall 411 and the application level filter 413 reside in the OS kernel as that is a more secure environment. However, the application level filter 413 may reside outside the kernel, if desired.

Figure 4B:
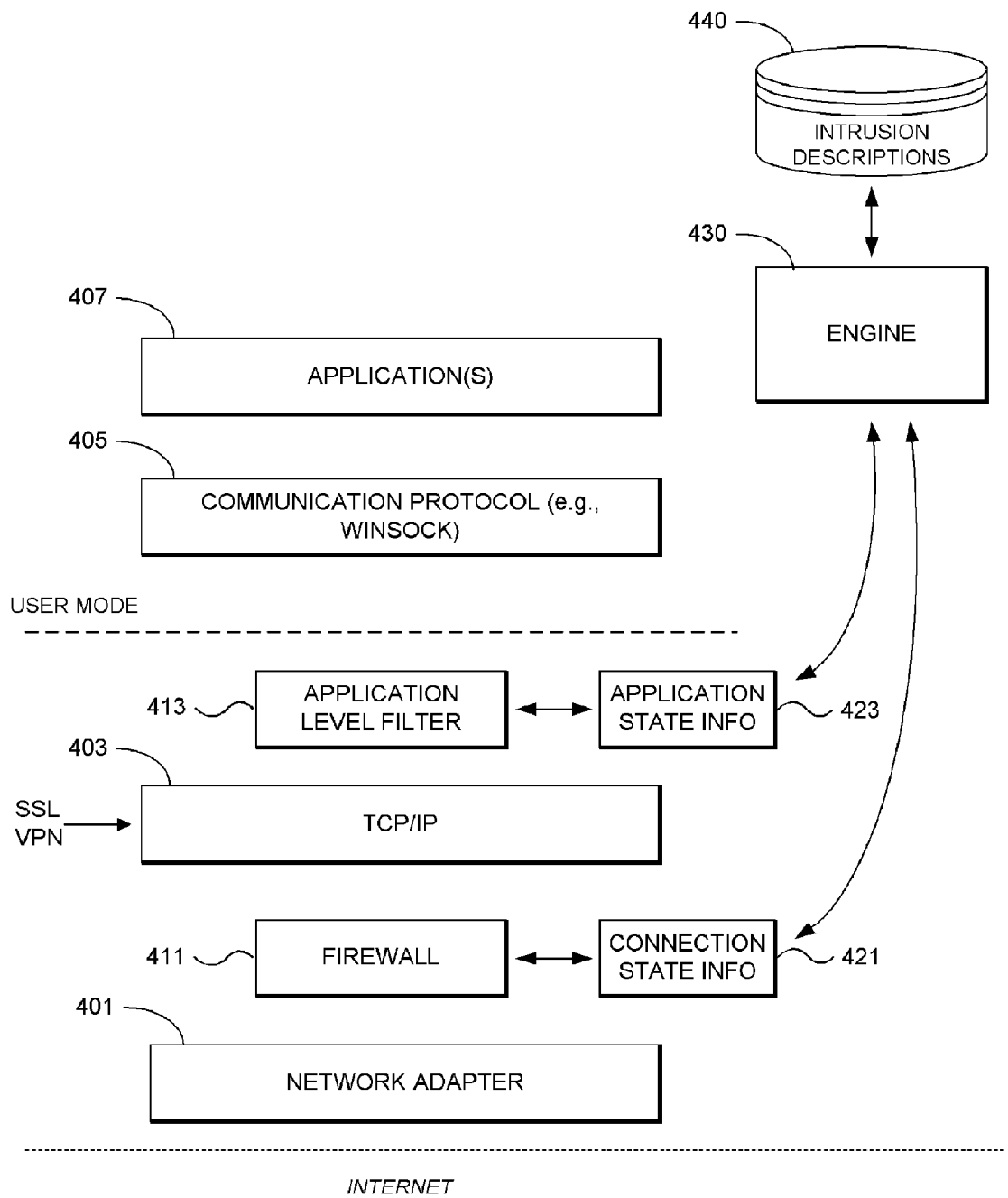
FIG. 4B is a diagram illustrating components of the intrusion detection/prevention system of the present invention.

FIG. 4B is a diagram illustrating components of the intrusion detection/prevention system of the present invention. As shown, the components of the system include the firewall 411, the application level filter 413, an engine 430, and intrusion descriptions (signatures) repository 440. Each of these components and their operation in detecting and preventing intrusions are described below.

The engine 430 evaluates whether particular traffic matches the pattern of a known attack or exploit to which a program (e.g., application) on the machine which is being protected may be vulnerable. The engine 430 has associated intrusion descriptions (repository 440) which comprise descriptions or signatures of known attacks or exploits (intrusions). These intrusion signatures indicate the pattern of a known attack or exploit and may be described using XML (Extensible Markup Language) or another format. The intrusion descriptions (440) may include common intrusion detection definitions such as regular expression parser definitions, firewall-style definitions (e.g., a particular port that is vulnerable, a given application that is vulnerable, etc.), snort rules, or the like. Snort is an open source network intrusion detection system, capable of performing traffic analysis and packet logging on IP networks. Snort includes a detection engine and uses a flexible rules language to describe traffic that it should collect or pass (referred to as snort rules). For further description of snort, see e.g., Snort User's Manual, available from The Snort Project, the disclosure of which is hereby incorporated by reference. A copy of this document is available via the Internet (e.g., currently at www.snort.org/docs/snort_manual.pdf).

Whether defined using snort rules or using another format, the intrusion descriptions can be considered to be similar to virus definition files for an anti-virus program. In the currently preferred embodiment, the intrusion descriptions repository 440 is stored in a local database and the intrusion descriptions are regularly updated from a central source (not shown at FIG. 4B). These updates of the intrusion descriptions repository 440 may be performed in a similar fashion as virus signature updates in which updated definition files are periodically downloaded from a central source.

In accordance with the methodology of the present invention, the intrusion descriptions (440) are supplemented to include particular information about the program (e.g., application), program version, registry settings, and so forth that more specifically define a vulnerability to a particular attack or exploit. By supplementing standard intrusion definitions (signatures) with extended attributes regarding the programs, components, registry settings, and other such information as hereinafter described, the engine 430 can more accurately determine whether particular traffic may represent an attack or exploit to which the machine on which the intrusion detection system is installed is, in fact, vulnerable. The engine may, for instance, determine that a particular exploit is not applicable because the presence (or absence) of a particular attribute. For example, if the version of the application that is the target of particular traffic is version 10, the application may not be vulnerable to an exploit that was patched in version 9 of the application.

The engine 430 is able to apply and use these definitions with extended attributes because the system and methodology of the present invention provides for associating state information with incoming communications at two different levels. As illustrated at FIG. 4B, state information is available at two levels: at the level of the firewall 411 and at the level of the application level filter 413. As shown at FIG. 4B, connection state information 421 is available at the level of the firewall 411 and application state information 423 is available at the application level filter 413. In operation, every time a state is created (e.g., when a connection is opened) at the application level (or at the firewall level), the engine 430 goes through the applicable intrusion descriptions in the repository 440 and determines whether or not particular intrusion descriptions may be applicable as hereinafter described. The engine 430 then determines the particular intrusion descriptions that are applicable to this connection. At the application level, the result is a very small subset of the total number of intrusion descriptions that are associated with a given application.

Consider an incoming communication packet. The firewall 411 is in a position to intercept and examine raw IP traffic, including fragmentations, ICMP (Internet Control Message Protocol) messages, and the like, that are processed by the TCP/IP layer 403. At the network layer, only items that the system cares about at that level are filtered, such as ICMP, IPMP, Synack messages (i.e., network traffic that normally is not destined for application software). As shown at FIG. 4B, at this level (i.e., the level of the firewall 411) state information is available, but the state information is on a per-connection basis and is not associated with a particular application (program). The present invention, in its currently preferred embodiment, generally considers only the potential intrusions that need to be resolved at this level (i.e., the ones that cannot be resolved at the level of the application level filter 413). For example, certain communications (e.g., pings) that are absorbed by the IP layer may need to be resolved at the firewall level. However most potential intrusions are evaluated at a higher level where additional state information is available.

At the level of the TCP/IP stack, the packets are split up based on the particular respective applications they are destined for (e.g., traffic for Microsoft Outlook, traffic for Internet Explorer, and so forth). Now, the traffic may be examined in a very different context. For the traffic destined for Microsoft Outlook, for example, the system of the present invention will know the exact context of Outlook (e.g., version number, registry settings, shared DLLs, exploits/vulnerabilities, and the like). Therefore, the system may generate a specific set of vulnerabilities that are applicable in this particular context. In this manner, the system of the present invention is able to come up with a narrow set of vulnerabilities that apply to a given particular data stream, and thus permitting more thorough analysis while at the same time reducing the number of false positives.

Of particular interest herein is the application level filter 413 which intercepts a stream of traffic above the TCP/IP stack 403 and below the communication layer (Winsock) 405. The application level filter 413 redirects the stream to the engine 430 and effectively splits the stream on a per-application (or per-program) basis. At the level of the application level filter 413, the state information associated with each separated stream provides information related to the definition of a socket (or equivalent in other environments) for the target program (or program component). This state information includes an identification of the program (e.g., application) or component that is the target of the communication and other information such as the local port, the remote port, the local IP address, and the remote IP address. This application state information comprises information that is reused for both inbound and outgoing communications by a given application or component.

By effectively separating the data streams on a per-program basis, each separate data stream can be examined by the engine 430 looking at the most narrow set of signatures (i.e., patterns) for that specific, separated data stream. Instead of comparing traffic to a list of hundreds or thousands of potential exploits and attacks, the methodology of the present invention enables the engine to only examine a small number of signatures that may be associated with a particular application or component. This is much more effective than looking for thousands of patterns in every item of traffic. Another advantage of examining only a small number of signatures for particular traffic is that it enables a more thorough and detailed examination to be made.

Another aspect of the present invention is that the application level filter 413 sits on the unencrypted side of the TCP/IP stack 403. If the environment includes a VPN connection or other encrypted session (e.g., SSL) to the machine, the encrypted session is typically resolved at the TCP/IP layer 403. As shown, because the application level filter 413 is above the TCP/IP layer 403, intercepting traffic at this level provides visibility to data streams that would otherwise be encrypted if intercepted at a lower level.

The methodology of the present invention provides several advantages, including improved performance and reducing the number of false positives that are generated. Another advantage that may result from use of the present invention is that it allows organizations to delay patching applications in an attempt to address known vulnerabilities in many cases. Delaying the application of patches can be a significant advantage, particularly for large organizations, as it enables the organization to wait for a more stable, better-tested set of patches or upgrades from the vendor(s).

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Figure 5:
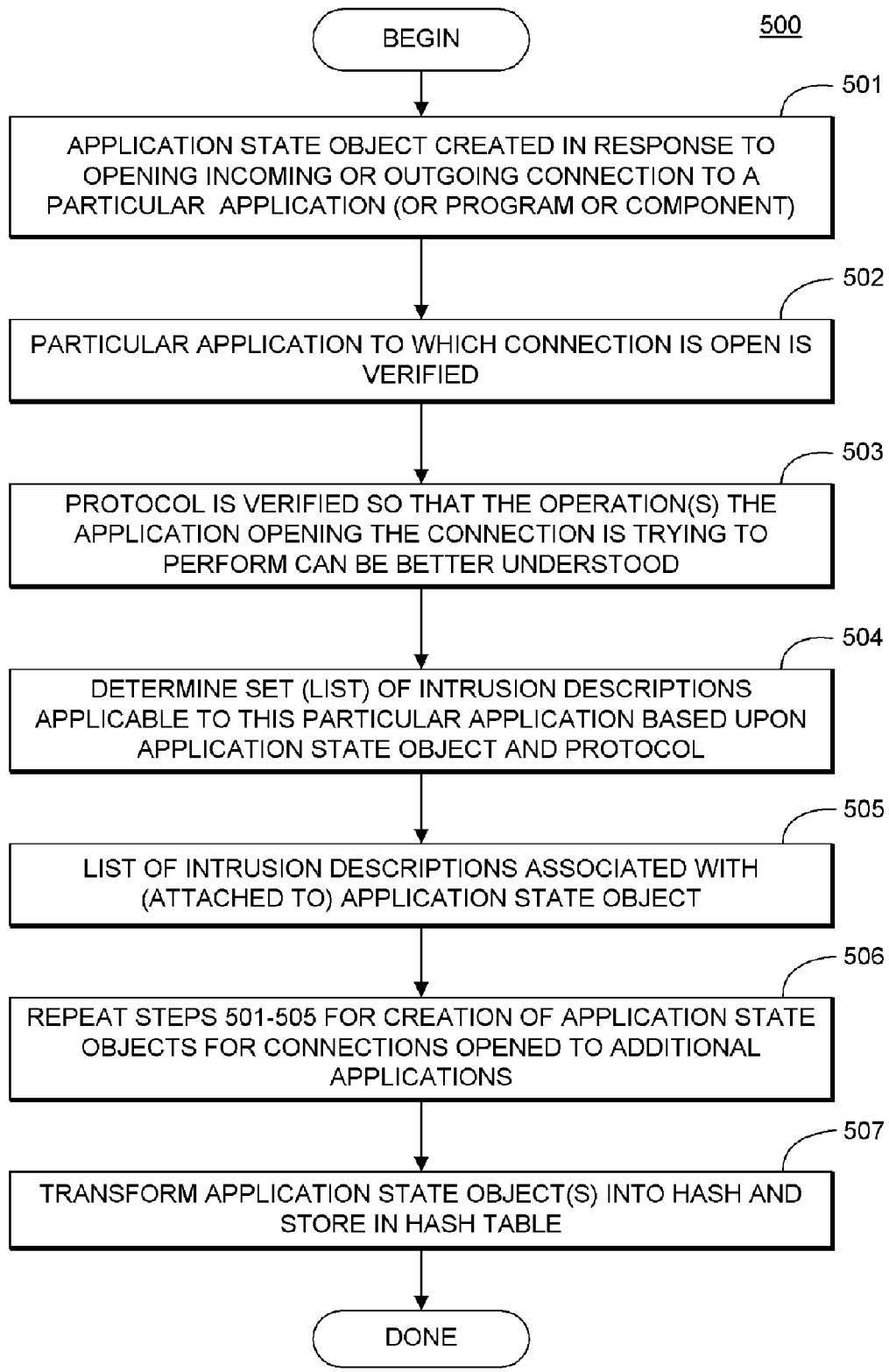
FIG. 5 is a high-level flowchart illustrating the set up and initialization of the system of the present invention for detecting and preventing intrusions.

FIG. 5 is a high-level flowchart 500 illustrating the set up and initialization of the system of the present invention for detecting and preventing intrusions. As described above, the system of the present invention starts with an inventory of intrusion descriptions which represent patterns or signatures of known attacks or exploits to which various application, programs, and components may be vulnerable. However rather than attempting to look for all of these patterns in traffic on a general basis, the present invention performs a more fine-grained analysis on a per-application basis as hereinafter described. The following discussion uses an example illustrating the analysis of traffic on a per-application basis at the level of the application level filter. However, it should be noted that the system also employs measures for examining traffic at the firewall level as previously described. Accordingly, those skilled in the art will appreciate that the following discussion is intended to illustrate the operations of the system of the present invention and not for purposes of limiting the scope of the invention.

The method begins with several initialization steps which are generally performed before traffic is examined for detecting intrusions. At step 501, an application state (object) is created in response to the opening of an incoming or outgoing connection to a given application or component. The application state is a memory object providing access to information about the connection opened to an application. An application state (object) typically includes a local port, a remote port, a local IP address (if the application has multiple IP addresses), a remote IP address, and an IP protocol (TCP, UDP, and so forth). It should be noted that although this discussion refers to an application, an application state object may also collect information separately for components of an application as previously described.

At step 502, the application to which the connection is opened is verified. The application may be verified using a checksum, or other means. For example, the system may check a checksum calculated for the application. The checksum is a value calculated to uniquely identify a file or group of data items which is generally calculated by treating the data items as numeric values and using a mathematical (i.e., "hashing") technique (e.g., CRC32 or MD5) to calculate a unique value from the data items. A checksum value computed on a file requiring protection against manipulation is stored and later used to determine whether or not the file has been altered or modified. The connection may be terminated if the application is not successfully verified.

After the application has been verified, the protocol is also verified at step 503. The protocol is verified so that the system can better understand what operation(s) the application opening the connection is trying to perform. For example, if the protocol that is used is HTTP and a non-standard port is used, the system may look at the first data stream to verify that the traffic looks like HTTP or take other actions to evaluate the operations that are being performed.

At step 504, the system's engine searches through the whole set of intrusion descriptions and determines the set of intrusion descriptions that are applicable to this particular application (e.g., based on extended attributes added to the intrusion descriptions as described above). Thus traffic may be examined in the context of all available information about the target application and the context in which it is running, including what version of the application is running and what modules are running in the context of that application. In the currently preferred embodiment, the intrusion descriptions are sorted and optimized to facilitate this search process. The intrusion descriptions also include extended attributes enabling the exploits that may be applicable to a given application to be more particularly identified. An advantage of this approach is that a short list of applicable intrusion descriptions is generated only when a new connection is created, which tends not to be a critically time-sensitive operation.

Generally, at this step the engine goes through the exploit (i.e., intrusion) descriptions in the local exploit description database (the intrusion descriptions repository 440 as illustrated at FIG. 4B) and determines those exploits actually fitting (matching) the protocol that is identified and the other information included in the application state (object). In determining a match the engine generally looks at the application, version, location, name, signature or checksum (e.g., MD5 or similar), components or modules (e.g., some exploits relate to a particular module such as a DLL), registry settings, and other attributes. For example, a registry setting indicating whether a specific service has been enabled or disabled might allow the engine to determine whether or not the application is vulnerable to a particular exploit. Other extended attributes of various types may also be considered during this process. Another example of an attribute that may indicate whether an exploit is applicable to a program is the mode in which the program is run. For instance, a program (e.g., Microsoft Outlook) run in a particular mode (e.g., Exchange mode) might not be vulnerable to a particular attack (e.g., POP3 attack). For any given application, the list of exploits to which the application is potentially vulnerable will typically be relatively short. Out of the thousands of known exploits, only a handful will usually apply to an application. Accordingly, only the intrusion descriptions of these exploits need to be considered when examining traffic to this application.

At step 505, the list (subset) of the intrusion (exploit) descriptions applicable to the application is then associated with (attached to) the application state object. Specifically, a filter object characterizing the set is created and attached to the application object. Any incoming and outgoing traffic for the application will be subject to only that particular subset of rules. Some of the intrusion descriptions may also have additional information, such as directional information, indicating when the exploit may be applicable. For instance, directional information may indicate that the exploit is applicable to traffic only if it is outgoing or only if it is incoming.

At step 506, the above steps 501-505 may be repeated for creation of additional application state objects as connections are opened to additional applications. In the currently preferred embodiment, each of these application state objects is translated into a hash and stored in a hash table at step 507 so as to enable a particular application state to be easily located. For example, the socket may be used as the basis of the hash. At this point the system has been initialized and application state objects have been created for open connections. The system may now examine traffic (e.g., traffic to a particular application for which an application state (object) has been created and applicable exploits identified). The operations performed in detecting and preventing exploits and other intrusions in communications to (and from) this application are described below.

Figure 6:
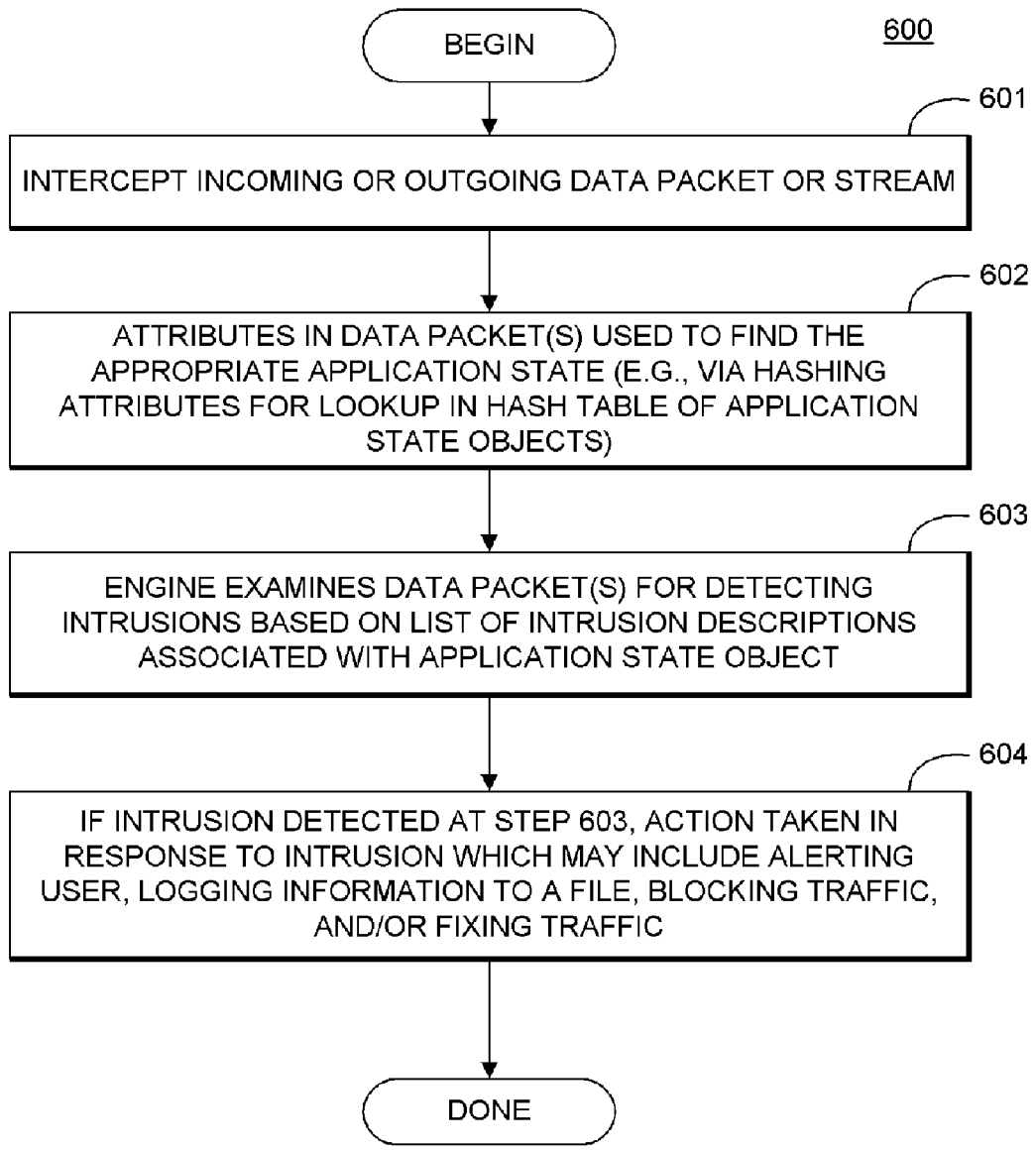
FIG. 6 is a high-level flowchart illustrating the operations of the system of the present invention in evaluating traffic in order to detect and prevent intrusions.

FIG. 6 is a high-level flowchart 600 illustrating the operations of the system of the present invention in evaluating traffic in order to detect and prevent intrusions. The following discussion assumes that the system has been set up and initialized as described above. The operations of the system in examining traffic and detecting and preventing intrusions generally proceed as follows.

At step 601, the system intercepts an incoming or outgoing data packet or stream. For purposes of the following discussion assume that the packet or stream is intercepted by the application level filter and redirected to the engine for examination. After a packet or stream is intercepted, attributes in the data packet(s) are used to find the appropriate application state (e.g., via hashing attributes of the data packet for lookup in a hash table containing the application states) at step 602. In one embodiment the socket (e.g., created by Winsock) can be used as a hash value into the application states instead of a full hash. The system then uses the identifier (ID) created based on attributes of the data packet to locate the appropriate application state (e.g., the application state for a particular socket connection to an application).

After the applicable application state object is located at step 603 the engine examines the data packet or stream using the list of intrusion descriptions associated with the application state object. At this step a pattern matching operation (or similar matching operation) is performed to determine if a data packet or a series of packets indicates a possible intrusion (i.e., attack or exploit attempt). In detecting an intrusion, this pattern matching operation may also involve examining the interaction of a series of packets, such as what packets are sent and what is received in response. Significantly, the methodology of the present invention provides that a very narrow, application-specific set of descriptions (i.e., signatures or patterns) are used in this detection process. This narrow set of descriptions is likely to be more accurate and also generates substantially fewer false positives than prior art solutions.

The methodology of the present invention also provides more time to drill down into the small number of definitions that may apply. As previously described, prior art solutions typically must quickly review thousands of exploit definitions that may potentially apply to any given packet (or series of packets) given the limited time period available for conducting this examination. By focusing on a smaller number of exploits that may be applicable to a particular application or component, the present invention enables a more thorough examination to be performed. Simply put, one can spend more time evaluating each exploit if there are only a small number of exploits to be considered instead of hundreds or thousands. The time that can be spent attempting to detect intrusions is necessarily limited. Users are generally unwilling to bog down their system to enable an intrusion detection engine to evaluate each packet in detail for thousands of potential exploits. There is only so much time that can be spent before this process becomes an unacceptable bottleneck on system performance.

Because the potential exploits have been narrowed and specifically defined and additional information (i.e., state information) is available, the present invention may examine each potential exploit in more detail. In some cases (e.g., RPC exploits), a pattern involving a number of data packets and interactions may need to be evaluated to determine if the pattern comprises an attack. Because the suspicious traffic is more narrowly defined, the system can spend extra time looking at each one (which normally would not be allowed for timing reasons in prior art systems which must evaluate a large number of potential exploits very quickly). Also, the present invention can better detect certain exploits which may require trapping a sequence of packets to detect a problematic set of interactions (e.g., in the case of RPC or similar exploits as described above). Prior art solutions examining a larger number of exploits and usually operating at a router or at a lower level of the communication stack generally do not have sufficient time available to trap a sequence of packets and perform a comparable analysis.

At step 604, action is taken in response to the detection of an intrusion at step 603 (i.e., detection of an attack or exploit). The actions taken may include alerting a user or administrator, logging the information to a file, blocking traffic, and/or other actions. The system of the present invention also provides the capability for correcting or fixing traffic in certain cases as an alternative to simply blocking it.

In some circumstances, it may be more efficient to fix traffic than to stop it. For example, assume that an email header is received and the email header includes a string which may cause a buffer overflow on a particular version of Microsoft Outlook. Certain older versions of Outlook have a vulnerability that can be exploited by including a particular date string in an email header. Basically, if the date string is not followed by a colon, and then a certain malformed date string follows, this condition may cause Outlook to buffer overflow. One possible approach is to simply terminate it, but terminating may cause blocking which prevents the receipt of other email. There are two other actions that the system can initiate in response to detecting this exploit. One action that can be performed is to instruct the specific email containing the buffer overflow attack to be deleted from the server. The system of the present invention may also take action to fix the data stream (i.e., the email header). In this example, the message header could be fixed by inserting a colon after the date string. In this case, a malicious data stream is still received and processed. However, the data stream is fixed so that it cannot cause damage. Alternatively, or in addition to fixing the header in this fashion, the system can provide for changing the email or issuing a message to indicate that the message contains an exploit and in response the system took action by changing the email. In certain cases when malicious data streams are identified, they can be fixed on the fly in this fashion to ensure that they will not cause damage.

The present invention provides an improved methodology for detecting and correcting attacks and exploits by narrowing the focus of investigation to a small number of potential exploits that may apply to particular traffic and evaluating these exploits at the application layer. As a result, the system can better detect threats and take action when they are detected. The system also generates fewer false positives than prior art intrusion detection/prevention solutions.

Another aspect of the present invention is the use of the invention for performing a vulnerability assessment of a system. As previously described, the system of the present invention includes intrusion descriptions (e.g., stored in a database). Using these intrusion descriptions, the system can perform a scanning process for determining the specific applications present on a given machine. The system of the present invention can then show the user the potential vulnerabilities of the machine based on the applications present on the machine. These vulnerabilities may also be sorted to indicate those that relate to a particular application, as desired. In addition, the set of exploits that is created in this fashion may also be associated with application(s) in advance, so that when the application state (object) is created for an application, the system does not have to examine (or re-examine) the global (master) list of intrusion definitions relating to many applications. Instead, the subset that has already been created (e.g., during the above vulnerability assessment), can be used in associating particular exploits with particular applications in use on the machine. This list of exploits can then be further narrowed when a connection is open and specific state information is available.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method implemented in a computer comprising at least one processor and a memory for detecting and preventing network intrusion, the computer having a TCP/IP (Transmission Control Protocol/Internet Protocol) communication stack to communicate with the network through a connected network adapter, the method comprising:

defining intrusion descriptions specifying both general and application-specific exploits that may be attempted by malicious network traffic, said application-specific intrusion descriptions indicating specific applications that may be targeted by individual exploits, said application-specific intrusion descriptions also including extended attributes indicating application states and modes of operation of said specific applications that may be targeted by the individual exploits;

each time a particular application of a given configuration establishes a new network connection, determining a current application state and mode of operation of the particular application and deriving a subset of the intrusion descriptions with extended attributes that characterize whether the current state and mode of operation of the particular application are targeted by exploits;

intercepting network traffic at first and second locations for detecting and preventing intrusion, wherein at the first location network traffic is intercepted between the network adapter and the TCP/IP communication stack and at the second location network traffic is intercepted between the TCP/IP communication stack and the particular application;

for the network traffic destined for the particular application that is intercepted at the second location, detecting, based on the subset of the intrusion descriptions specifically applicable to that application and based on current state and mode of operation of the particular application, whether the network traffic destined for the particular application is an attempted network intrusion; and if a network intrusion is detected, blocking network traffic destined for the particular application determined to comprise an exploit.

2. The method of claim 1, wherein the detected network intrusion comprises at least one malicious packet intended to exploit a vulnerability of the particular application.

3. The method of claim 2, wherein the vulnerability comprises a buffer overflow vulnerability.

4. The method of claim 1, wherein the method is repeated for a plurality of applications participating in network communication, wherein each application is associated with its own specific subset of intrusion descriptions, and wherein network traffic is examined for intrusions on a per-application basis.

5. The method of claim 1, wherein said intrusion descriptions further indicate a particular context of the specific applications that may be targeted by individual exploits.

6. The method of claim 5, wherein said particular context includes a particular version of a given application.

7. The method of claim 6, wherein if the network intrusion comprises an exploit for a particular version of the particular application being monitored, said blocking step occurs only if that particular version is present.

8. The method of claim 5, wherein said particular context includes associated components used for a given application.

9. The method of claim 8, wherein if the network intrusion comprises an exploit for a particular component of the particular application being monitored, said blocking step occurs only if that particular component is present.

10. The method of claim 5, wherein said particular context includes associated registry settings used for a given application.

11. The method of claim 10, wherein if the network intrusion comprises an exploit for a particular registry setting of the particular application being monitored, said blocking step occurs only if that particular registry setting is present.

12. The method of claim 1, further comprising:
automatically fixing network traffic determined to comprise an exploit, by eliminating a portion of the network traffic that comprises the exploit but otherwise allowing remaining network traffic to proceed.

13. The method of claim 1, wherein the detected network intrusion comprises a sequence of malicious packets intended to exploit a vulnerability of the particular application.

14. The method of claim 1, wherein the subset of the intrusion descriptions specifically applicable to the particular application is narrowed based on state information further characterizing the network traffic destined for the particular application.

15. The method of claim 1, further comprising:
downloading a set of computer-executable instructions for performing the method.

16. A network intrusion detection and prevention system comprising:
a computer connected to a network, the computer having a TCP/IP (Transmission Control Protocol/Internet Protocol) communication stack to communicate with the network through a connected network adapter;
a plurality of intrusion descriptions specifying both general and application-specific exploits that may be attempted by malicious network traffic, said application-specific intrusion descriptions indicating specific applications that may be targeted by individual exploits, said application-specific intrusion descriptions also including extended attributes indicating application states and modes of operation of said specific applications that may be targeted by the individual exploits;
a module for determining a current application state and mode of operation of the particular application each time a particular application establishes a new network connection and deriving a subset of the intrusion descriptions specifically applicable to a particular application of a given configuration that participates in network communication, which characterize whether the current state and mode of operation of the particular application are targeted by exploits;
a module for intercepting network traffic at first and second locations for detecting and preventing intrusion, wherein at the first location network traffic is intercepted between the network adapter and the TCP/IP communication stack and at the second location network traffic is intercepted between the TCP/IP communication stack and the particular application; and
an application filter for monitoring network traffic destined for the particular application that is intercepted at the second location, and monitoring current state and mode of operation of the particular application for detecting an attempted network intrusion based on the subset of the intrusion descriptions specifically applicable to the particular application based on current state and mode of operation of the particular application, whether the network traffic destined for the particular application is an attempted network intrusion, and for blocking network traffic destined for the particular application determined to comprise an exploit.

17. The system of claim 16, wherein the detected network intrusion comprises at least one malicious packet intended to exploit a vulnerability of the particular application.

18. The system of claim 17, wherein the vulnerability comprises a buffer overflow vulnerability.

19. The system of claim 16, wherein the system accommodates a plurality of applications participating in network communication, wherein each application is associated with its own specific subset of intrusion descriptions, and wherein network traffic is examined for intrusions on a per-application basis.

20. The system of claim 16, wherein said intrusion descriptions further indicate a particular context of the specific applications that may be targeted by individual exploits.

21. The system of claim 20, wherein said particular context includes a particular version of a given application.

22. The system of claim 21, wherein if the network intrusion comprises an exploit for a particular version of the particular application being monitored, the application filter performs said blocking only if that particular version is present.

23. The system of claim 20, wherein said particular context includes associated components used for a given application.

24. The system of claim 23, wherein if the network intrusion comprises an exploit for a particular component of the particular application being monitored, the application filter performs said blocking only if that particular component is present.

25. The system of claim 20, wherein said particular context includes associated registry settings used for a given application.

26. The system of claim 25, wherein if the network intrusion comprises an exploit for a particular registry setting of the particular application being monitored, the application filter performs said blocking only if that particular registry setting is present.

27. The system of claim 16, further comprising:
a module for automatically fixing network traffic determined to comprise an exploit, by eliminating a portion of the network traffic that comprises the exploit but otherwise allowing remaining network traffic to proceed.

28. The system of claim 16, wherein the detected network intrusion comprises a sequence of malicious packets intended to exploit a vulnerability of the particular application.

29. The system of claim 16, wherein the subset of the intrusion descriptions specifically applicable to the particular application is narrowed based on state information further characterizing the network traffic destined for the particular application.

30. An improved network intrusion detection and prevention system comprising:
a computer that receives network traffic from a network, the computer having a TCP/IP (Transmission Control Protocol/Internet Protocol) communication stack for communication with the network through a connected network adapter;
intercepting network traffic at first and second locations for detecting and preventing intrusion, wherein at the first location network traffic is intercepted between the network adapter and the TCP/IP communication stack and at the second location network traffic is intercepted between the TCP/IP communication stack and split into different streams of network packets, based on which respective application each individual network packet is destined for;
for a given stream and its respective application, determining particular intrusion detection signatures applicable to the current state and mode of operation of that respective application that are targeted by exploits each time said respective application establishes a new network connection, said particular intrusion detection signatures including extended attributes indicating current application state and mode of operation of said respective application that may be targeted by individual exploits; and
applying intrusion detection and prevention to the given stream that is intercepted at the second location based on the particular intrusion detection signatures applicable to the given stream's respective application, such that intrusion detection and prevention is applied based on current state and mode of operation of operation of the respective application.

31. The improved system of claim 30, wherein each intrusion detection signature is associated with information indicating a particular context of a given application that is required for exploitation by malicious network traffic.

32. The improved system of claim 31, wherein said particular context includes a particular version of a given application.

33. The improved system of claim 31, wherein said particular context includes information indicating whether a given application has been patched for a given exploit.

34. The improved system of claim 31, wherein network traffic for the given stream is blocked only when the particular context required for a given exploit to succeed exists.

35. The improved system of claim 30, wherein each intrusion detection signature is associated with connection state information indicating a particular connection state that is required for exploitation by malicious network traffic.

36. A system for blocking malicious network traffic, the system comprising:
a computer connected to a network, the computer having a TCP/IP (Transmission Control Protocol/Internet Protocol) communication stack for communication with the network through a connected network adapter;
a repository storing information specifying on a per-application basis various exploits that may be attempted by network traffic against applications, said repository further characterizing the exploits based on application states and modes of operation of those applications that are susceptible to the exploits;
a module for determining a current application state and mode of operation of a particular application each time the particular application establishes a new network connection and deriving a subset of exploits specifically applicable to the particular application based on the current state and mode of operation of the particular application;
a module intercepting network traffic at first and second locations for detecting and preventing intrusion, wherein at the first location network traffic is intercepted between the network adapter and the TCP/IP communication stack and at the second location network traffic is intercepted between the TCP/IP communication stack and the particular application;
a module for application-specific monitoring of network traffic that is intercepted at the second location, such that only network traffic destined for a particular application having a current state and mode of operation susceptible to an exploit is examined for exploits relevant to that particular application based on the exploits specifically applicable to said particular application and based on current state and mode of operation of said particular application; and
a module, responsive to said module for application-specific monitoring, for blocking network traffic identified as an exploit based on the exploits specifically applicable to said particular application based on current state and mode of operation of said particular application.

37. The system of claim 36, wherein said repository stores intrusion detection signatures, each intrusion detection signature being associated with information indicating a particular context of a given application that is required for exploitation by malicious network traffic.

38. The system of claim 37, wherein said particular context includes a particular version of a given application.

39. The system of claim 37, wherein said particular context includes information indicating whether a given application has been patched for a given exploit.

40. The system of claim 37, wherein network traffic destined for a given application is blocked only when the particular context required for a given exploit to succeed exists.

41. The system of claim 37, wherein each intrusion detection signature is associated with connection state information indicating a particular connection state that is required for exploitation by malicious network traffic.

* * * * *